(12) United States Patent
Harnay

(10) Patent No.: US 10,536,546 B2
(45) Date of Patent: Jan. 14, 2020

(54) METHOD FOR MANAGING ACCESS TO A SET OF RESOURCES DELIVERED VIA AN ELECTRONIC DEVICE

(75) Inventor: Franck Harnay, Rueil-Malmaison (FR)

(73) Assignee: SAGEMCOM ENERGY & TELECOM SAS, Rueil-Malmaison (FR)

(*) Notice: Subject to any disclaimer, the term of this patent is extended or adjusted under 35 U.S.C. 154(b) by 0 days.

(21) Appl. No.: 14/235,963

(22) PCT Filed: Jul. 20, 2012

(86) PCT No.: PCT/EP2012/064309
§ 371 (c)(1),
(2), (4) Date: Apr. 21, 2014

(87) PCT Pub. No.: WO2013/017442
PCT Pub. Date: Feb. 7, 2013

(65) Prior Publication Data
US 2015/0163315 A1 Jun. 11, 2015

(30) Foreign Application Priority Data
Jul. 29, 2011 (FR) .................................. 11 56987

(51) Int. Cl.
*H04L 29/08* (2006.01)
*H04L 12/24* (2006.01)
*H04L 12/28* (2006.01)
*H04L 29/06* (2006.01)

(52) U.S. Cl.
CPC ...... *H04L 67/2814* (2013.01); *H04L 12/2816* (2013.01); *H04L 41/0253* (2013.01); *H04L 41/0293* (2013.01); *H04L 67/125* (2013.01); *H04L 67/2819* (2013.01); *H04L 67/327* (2013.01); *H04L 67/42* (2013.01)

(58) Field of Classification Search
CPC ..... H04L 67/28–2814; H04L 29/08144; H04L 12/28–2827
See application file for complete search history.

(56) References Cited

U.S. PATENT DOCUMENTS 6,990,653 B1 * 1/2006 Burd ................. G06F 17/30893
707/E17.117
7,287,042 B1 * 10/2007 Jassy ................. G06F 17/30864
(Continued)

OTHER PUBLICATIONS

International Preliminary Report on Patentability, with English translation, dated Feb. 22, 2014, 9 pages.
(Continued)

*Primary Examiner* — Clayton R Williams
(74) *Attorney, Agent, or Firm* — Nixon & Vanderhye PC

(57) ABSTRACT

The present invention concerns the field of the management of access to resources by an electronic device, in particular in the case where this device is controlled by firmware stored in a rewritable non-volatile memory.

The invention aims to solve the aforementioned problems by the use of a reverse proxy module on the device that enables locating some of the resources of the management interface on a remote server. Access to these resources causes a redirection of the request to the remote server, the response from which is then transmitted to the local client by the device as if it came directly from the device.

5 Claims, 2 Drawing Sheets

(56) References Cited

U.S. PATENT DOCUMENTS

| | | | | |
|---|---|---|---|---|
| 2001/0025307 | A1* | 9/2001 | Venkatraman | H04L 12/2803 709/218 |
| 2004/0054860 | A1* | 3/2004 | Dixit | G06F 12/0888 711/160 |
| 2004/0128346 | A1* | 7/2004 | Melamed | G06F 17/30902 709/203 |
| 2005/0265317 | A1* | 12/2005 | Reeves | H04L 29/12066 370/235 |
| 2008/0034425 | A1* | 2/2008 | Overcash | G06F 21/55 726/22 |
| 2008/0085096 | A1* | 4/2008 | Marshall | G11B 27/034 386/278 |
| 2008/0275980 | A1* | 11/2008 | Hansen | G06Q 30/02 709/224 |
| 2011/0307490 | A1* | 12/2011 | Chow | G06F 17/30867 707/741 |
| 2012/0084833 | A1* | 4/2012 | Thomas | G06F 17/30867 726/3 |

OTHER PUBLICATIONS

International Search Report for PCT/EP2012/064309, dated Aug. 16, 2012.
Written Opinion of the International Searching Authority for PCT/EP2012/064309, dated Aug. 16, 2012.
Peisel, B., "Designing the Next Step in Internet Appliances", Electronic Design, vol. 46, No. 7, (Mar. 23, 1998), pp. 50, 52, 56.

\* cited by examiner

METHOD FOR MANAGING ACCESS TO A SET OF RESOURCES DELIVERED VIA AN ELECTRONIC DEVICE

This application is the U.S. national phase of International Application No. PCT/EP2012/064309, filed 20 Jul. 2012, which designated the U.S. and claims priority to FR Application No. 11/56987, filed 29 Jul. 2011, the entire contents of each of which are hereby incorporated by reference.

The present invention concerns the field of managing access to resources by an electronic device, in particular in the case where this device is controlled by firmware stored in a rewritable non-volatile memory.

More and more electronic devices are connected to the Internet. They are also accessible typically via a local communication network from local clients such as portable computers, intelligent telephones, tablet computers, etc. Among these devices are residential gateways, known by the term box, or the latest generations of television sets or television offer decoders, smart electric meters and the like.

These devices are typically controlled by firmware stored in a rewritable non-volatile memory referred to as flash memory. These devices typically offer the possibility of configuring them or using the data thereof via an interface accessible from a local client on the residential network of the user. Typically the protocol used is the HTTP protocol (HyperText Transfer Protocol). To do this, a web server is implemented within the firmware in order to offer the local client access to a management interface of the device by means of a standard web browser. This web server affords access by the client to resources delivered by the device. The description is based on the use of the HTTP protocol and therefore of a web server, but the invention may be based on any other protocol affording access to the resources of a device in a similar manner, for example the FTP protocol (File Transfer Protocol) although it is less flexible to use.

This type of device generally has limited resources, in particular in terms of memory. In addition, when an operator is responsible for managing a set of devices and he wishes to change the interface for managing the device by the local client, it is then necessary to update the firmware of the device, which requires an infrastructure that is complex and difficult to manage when the installed set of devices is large. It may also be wished to customize this interface for a category of user or the same model of device may be manufactured by the same manufacturer and managed by different operators. It is then necessary to manage a heterogeneous interface for a same model of device.

The invention aims to solve the aforementioned problems by implementing a selective redirection module (reverse proxy) on the device that enables locating some of the resources of the management interface on a remote server. Access to these resources causes a redirection of the request to the remote server, the response of which is then transmitted to the local client by the device as if it came directly from the device. In this way, the device locally manages a reduced number of resources, typically the resources generated by the device. When it is wished to change the management service, it suffices to update the remote resources in order to change the service. It is no longer necessary to deploy a new version of the firmware on the set of devices.

The invention concerns a method for managing access to a set of resources delivered by an electronic device, said device being controlled by firmware stored in a rewritable non-volatile memory, comprising, by said device, a step of receiving a request sent by a local client connected to said device for a resource managed by said device; a step of evaluating a criterion by analysis of said request by a reverse proxy module in said device; a step of redirecting said request according to the result of the evaluation of said criterion to a local resource server or to a remote resource server accessible to the device, and a step of sending, to the local client, the response given by the server to which the request was directed.

According to a particular embodiment, the requests and responses are in the HTTP format.

According to a particular embodiment, the step of evaluating a criterion comprises a step of analysing the URL designating the resource.

According to a particular embodiment, the redirection step redirects the request to a local server or a plurality of remote servers.

According to a particular embodiment, the redirection step redirects the request to a local server when the resource is dynamic and to a remote server when the resource is static.

The invention also concerns an electronic device comprising a service managing access to a set of resources delivered by said electronic device, said device being controlled by firmware stored in a rewritable non-volatile memory, comprising means for receiving a request sent by a local client connected to said device for a resource managed by said device; means for evaluating a criterion by analysis of said request by a reverse proxy module in said device; means for redirecting said request according to the result of the evaluation of said criterion to a local resource server or to a remote resource server accessible to said device and means for sending to the local client the response given by the server to which the request was directed.

The features of the invention mentioned above, as well as others, will emerge more clearly from a reading of the following description of an example embodiment, said description being given in relation to the accompanying drawings, among which:

Figure 1:
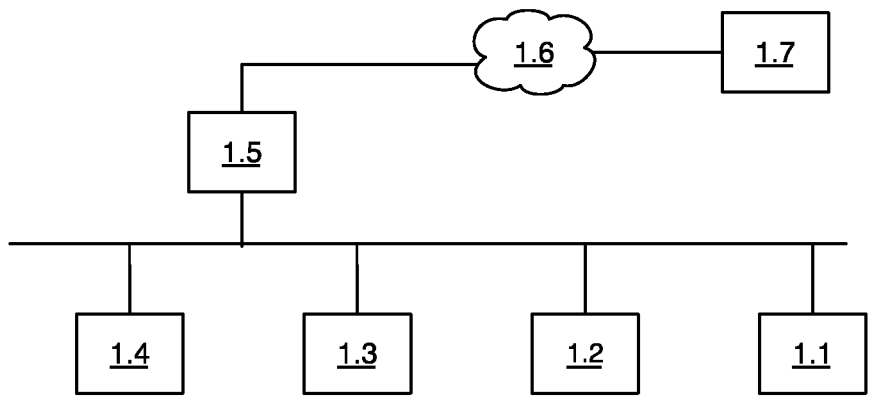
FIG. 1 illustrates the architecture of an example embodiment of the system integrating the invention.

The invention concerns a device used typically in an architecture as illustrated in FIG. 1. In this architecture, there are several items of equipment 1.1, 1.2, 1.3 and 1.4 connected to a local network. These items of equipment can therefore communicate with each other. A residential gateway 1.5 is also connected to the local network and gives access to a communication network 1.6. This gateway is typically an ADSL (Asymmetric Digital Subscriber Line) modem serving as a wireless access point of the WiFi type. However, any other technology may be used. Access to the communication network, typically the Internet, can be achieved by a cabled network, an optical-fibre network or a conventional modem of the STN type on the switched telephone network. According to some embodiments of the invention, access to the communication network may use a data network telephone technology, for example GPRS (General Packet Radio Service), UMTS (Universal Mobile Telecommunications System) or the like.

The residential local network may be based on a wireless technology such as WiFi or a wired network, for example Ethernet. In some embodiments, the residential local network will be reduced to a simple point-to-point connection between a client and a device able to access the Internet. This point-to-point connection may be a WiFi or Bluetooth connection for example.

Remote servers 1.7 are connected to the communication network. These servers may consequently be accessed from any device connected to the local network. Connection to the server then passes through the gateway 1.5.

We are concerned with devices connected to the local network and having access to a communication network such as the Internet for example. Many of these devices offer a service to the user. These include for example the access gateway 1.5 itself, latest-generation connected television sets, digital television decoders or connected energy meters such as the latest-generation electric meters.

In addition to their basic service, these appliances typically offer a service for managing the appliance. This service allows customizing the service offered, to configure the device or to access internal data of this device. This management service allows access to a set of resources delivered by the device. Typically access takes place from a local client connected to the local network using a browser of the web browser type. The service is then implemented in the form of a web server integrated in the device that is to be managed. The use of a web browser and the HTTP protocol and therefore an implementation of the management service in the form of a web server is only one example of implementation. Other protocols and associated tools may also be used instead.

Typically, these devices are mass-market devices and their resources are limited. They are generally controlled by firmware that is typically stored in a rewritable non-volatile memory, for example of the flash memory type. The management service is then integrated in this control firmware, typically in the form of a set of static and dynamic resources. The static resources comprise images, static HTML pages, texts, and optionally audio and/or video resources. The dynamic resources comprise data produced by the device such as, for example, statistical data elements such as connection durations, quantities of data exchanged or the like.

These devices are generally managed by a service operator. For example, Internet access gateways are typically managed by an Internet access provider such as Orange, Free, SFR or the like. Digital television decoders are managed by television broadcasters. Intelligent electric meters are managed by the energy suppliers. These operators manage an installed set of devices that may be very numerous and that may group together heterogeneous models. It is advantageous for these operators to be able to develop the device management service. These changes may be complex and comprise the addition of new functionalities or more simply they may concern a simple modification of the graphic chart of the operator. In the latter case, it may simply be a case of changing a few logos, graphics or style sheets. A development of the service then requires updating the firmware, typically by downloading a complete new version of this software. It may then be necessary to update a heterogeneous set of models each having its firmware version in order simply to change a few graphical data.

It is also desirable to be able to provide a different version of the service to certain categories of user, for example according to a subscription level or the like. This requires an increase in the firmware versions that is complex to manage.

It may also be wished to aggregate data of heterogeneous provenance. Let us take the example of a smart electric meter that stores consumption statistics concerning the last 48 hours while the older data are stored on a remote server. It is then advantageous to be able to give access to all the data whether they be stored locally or remotely, in a manner transparent to the user.

The invention solves these problems by using in the device a module for selectively redirecting requests (reverse proxy). In this way, some of the resources necessary for the management service may be offset onto a remote server. These remote services will be accessible to a client local to the network in a manner that is transparent for this local client.

Figure 2:
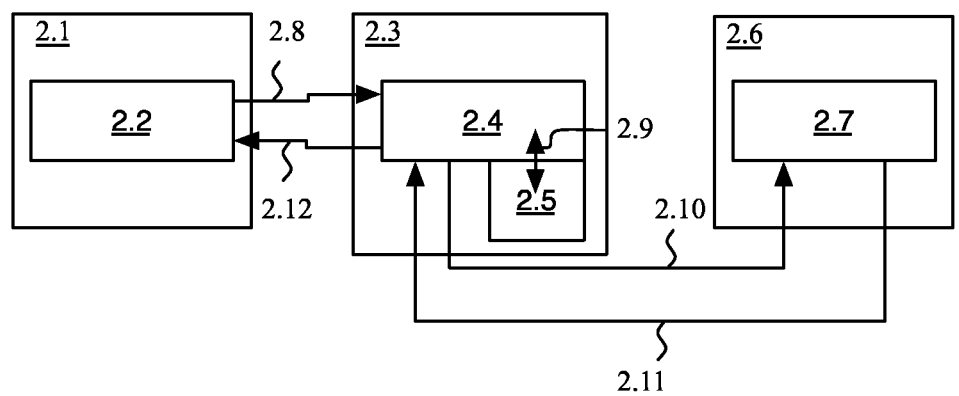
FIG. 2 illustrates the components of the invention according to an example of the invention.

The functioning of the management service is illustrated in FIG. 2. In this figure, the local client 2.1, via its web browser 2.2, sends a request 2.8 to the device 2.3 for a resource, typically a web page for managing the service. The device comprises a reverse proxy module 2.4 and a local web server 2.5. The reverse proxy module 2.4 then analyses the request and evaluates a criterion according to this request. According to the embodiment of the invention, this criterion corresponds to the evaluation of a particular domain of the address of the URL (Universal Resource Locator) type of the resource requested.

According to this criterion, the request received from the local client 2.1 will be redirected either to the internal web server, exchange 2.9, or to a remote server 2.6, exchange 2.10. In the latter case the request 2.10 is then managed by a remote web server 2.7 operated by the remote server 2.6. The response to this request is then produced either by the local web server 2.5 or by the remote web server 2.7 in order to be returned, 2.9 and 2.11, to the reverse proxy module 2.4. The reverse proxy module 2.4 then sends the response 2.12 to the local client 2.1. The result of the request is then displayed within the browser 2.2.

Reverse proxy modules are known for serving as a front end of a web server requiring a plurality of effective servers. They are then used for concealing this plurality of services behind a single address. They may then serve for load balancing or be a single point for protecting the servers against malevolent attacks.

The management service of the device is implemented in the form of interpreted programs (scripts) implanted in HTML pages. Two techniques for implanting such scripts are known. A first one consists of causing the program to be executed by the server in order to send the result of the program in response to the request. This technique requires having available considerable computing and interpretation resources on the server. A second technique consists of having the program executed by the browser. In this case, the program is included in the response to the request, the browser executes the program received on the client and displays the result of the program. It is possible to mix the two techniques within the same service implementation. In the context of the invention, since the resources of the device implementing the server responsible for the management service are limited, the second technique is naturally favoured.

For security reasons, an interpreted program executed by a client in a browser can send a request only to the server onto which it is being downloaded. This limitation aims to avoid the vulnerabilities known as inter-site program or XSS (cross site scripting). In this context, it will therefore not be possible for this program to directly request the resources managed by the remote server from the latter. This constraint is taken into account by the invention because the communication of the local client takes place solely with the device. The solution described therefore does not introduce any security weakness.

Advantageously, the resources necessary for the management servers to operate are distributed between the device and the remote server according to their static or dynamic nature. The static data consists of texts, images, forms, style sheet files, for example CSS (Cascading Style Sheet) files among other things. The dynamic data consist of data calculated or produced by the device. These data are typically local. It is therefore advantageously chosen that these dynamic data be made managed by the local server while the static data are managed by the remote server. In this way, if the operator chooses to change the presentation of the management server all he has to do is to change the static data on the remote server for this change to be immediately effective on all the devices in the set.

Implementation of this distribution appears in the used URLs. For example, a local resource may have its URL having the form: "/servlet/ . . . ". The remote resources may have the form: "/ . . . " not comprising the word "servlet" at the beginning. Alternatively an explicit referencing of the remote sources may also be adopted, for example: "/remote/ . . . ". In some embodiments, the remote data may be distributed over several servers. It is then possible to have UTLs of the form: "/remote1/ . . .", "/remote2/ . . .", etc.

Advantageously, a local management of a cache memory may avoid repeatedly downloading the same remote resources. They will then be downloaded only when modified. The use of a cache memory also allows the management service be available even in the case of the connection with the remote server being cut off. This cache memory allows avoiding redundant downloads if several local clients access the management service of the same device. The local clients typically manage also a local cache memory, which avoids redundant requests to the device.

Figure 3:
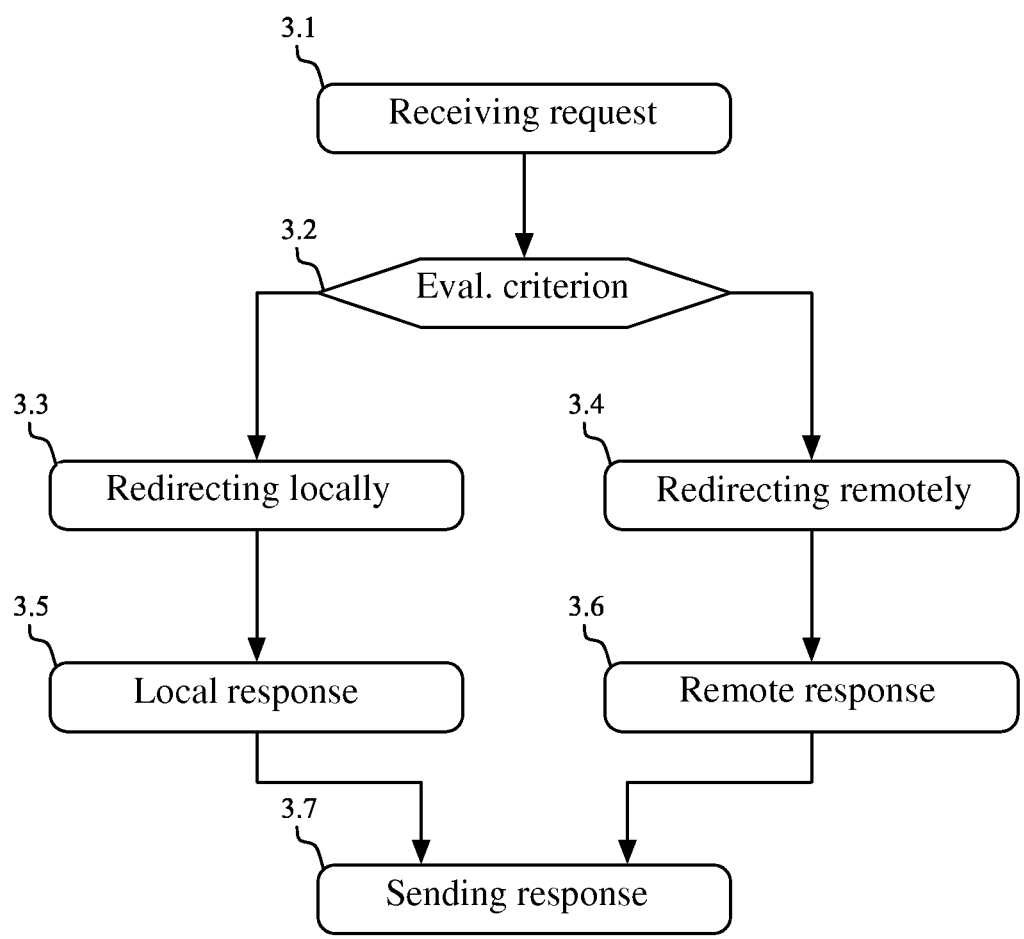
FIG. 3 illustrates the operating method of an example embodiment of the invention.

FIG. 3 illustrates the operating algorithm of the reverse proxy module according to the invention.

During a first step 3.1, the module receives a request for a resource sent by a local client. This request is typically an HTTP request for a URL.

During a step 3.2, the received request is analysed in order to evaluate a redirection criterion. Typically it is a case of analysing the beginning of the URL in order to determine the destination of the request. Any type of criterion may be used here according to the chosen implementation.

If the evaluation of the criterion determines that the resource must be locally sought, switch is made to a step 3.3 of local redirection of the request. If the resource must be sought on a remote server, switch is made to a step 3.4 of remote redirection of the request to a remote server.

The response from the server to which the request was directed is then received. Therefore either a local response, step 3.5, or a remote response, step 3.6, is received.

In a last step 3.7, the received response is sent to the local client originating the request.

It is therefore found that the invention simplifies administration of a management service embedded in the firmware of an electronic device. This simplification is done without introducing any security weakness.

The invention claimed is:

1. A method for managing content of a user interface of an electronic device, the electronic device providing a service and hosting a local server, the method being executed by the electronic device and comprising:
   providing the user interface for the service, the user interface including a dynamic resource and a static resource;
   receiving a first request sent by a local client connected to the electronic device for a first resource for the user interface, the first request comprising a first information designating the first resource;
   determining, by a reverse proxy module located inside the electronic device, that the first resource is static by analysing the first information, the static resource being data managed by a remote resource server external to the electronic device;
   redirecting the first request to the remote resource server accessible to the electronic device;
   receiving a first response made by the remote resource server to which the request has been redirected;
   sending the first response to the local client for the user interface;
   receiving a second request sent by the local client connected to the electronic device for a second resource for the user interface, the second request comprising a second information designating the second resource;
   determining, by the reverse proxy module in the electronic device, that the second resource is dynamic by analysing the second information, the dynamic resource comprising data produced by the electronic device;
   redirecting the second request to the local server located inside the electronic device; and
   sending a second response from the local server to the local client for the user interface.

2. The method according to claim 1, wherein the electronic device redirects the first request to a plurality of remote servers.

3. The method according to claim 1, the local client executing a browser to access a set of resources delivered by the electronic device, the method comprising a step of sending to the local client an interpreted program to be executed by the browser, the interpreted program being configured to generate the first request and the second request.

4. An electronic device comprising:
   circuitry causing the device to perform:
      providing a service;
      hosting a local server configured to provide a user interface of the service to a local client;
      receiving a first request from the local client for a first resource for the user interface, the first request comprising a first information designating the first resource;
      determining, by a reverse proxy module located inside the electronic device, that the first resource is static by analysing the first information, the static resources being data managed by a remote resource server external to the electronic device;
      redirecting the first request to the remote resource server accessible to the electronic device;
      receiving a first response made by the remote resource server to which the request has been redirected;
      sending the first response to the local client for the user interface;
      receiving a second request from the local client for a second resource for the user interface, the second request comprising a second information designating the second resource;
      determining, by the reverse proxy module, that the second resource is dynamic by analysing the second information, the dynamic resources comprising data produced by the electronic device;
      redirecting the second request to the local server located inside the electronic device; and sending a second response from the local server to the local client for the user interface.

5. A non-transitory storage medium having stored thereon instructions that, when executed by a processor of an electronic device providing a service and hosting a local server, causes the processor to perform a method for managing content of a user interface of the electronic device, wherein the method comprises:

provifing the user interface for the service, the user interface including a dynamic resource and a static resource;

receiving a first request sent by a local client connected to the electronic device for a first resource for the user interface, the first request comprising a first information designating the first resource;

determining, by a reverse proxy module located inside the electronic device, that the first resource is static by analysing the first information, the static resource being data managed by a remote resource server external to the electronic device;

redirecting the first request to the remote resource server accessible to the electronic device;

receiving a first response made by the remote resource server to which the request has been redirected;

sending the first response to the local client for the user interface;

receiving a second request sent by the local client connected to the electronic device for a second resource for the user interface, the second request comprising a second information designating the second resource;

determining, by the reverse proxy module in the electronic device, that the second resource is dynamic by analysing the second information, the dynamic resource comprising data produced by the electronic device;

redirecting the second request to the local server located inside the electronic device; and sending the second response from the local server to the local client for the user interface.

* * * * *